A. WILKINSON.
CONSTRUCTION OF THE BODIES OF MOTOR CARS AND OTHER VEHICLES.
APPLICATION FILED MAY 4, 1915.
1,167,035. Patented Jan. 4, 1916.
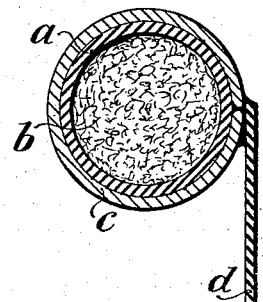
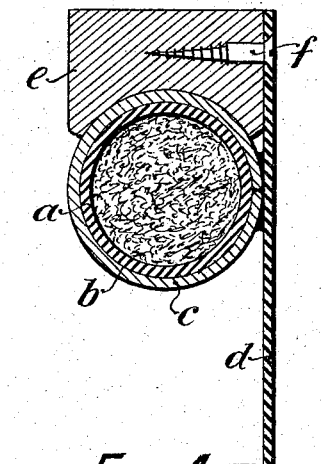
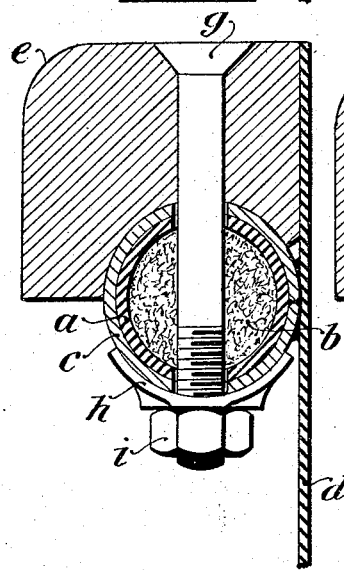
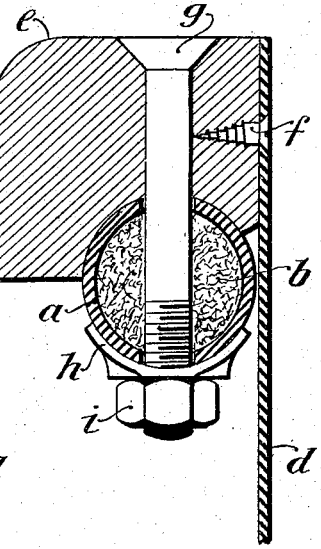

UNITED STATES PATENT OFFICE.

ALFRED WILKINSON, OF ILKLEY, ENGLAND.

CONSTRUCTION OF THE BODIES OF MOTOR-CARS AND OTHER VEHICLES.

1,167,035.        Specification of Letters Patent.        Patented Jan. 4, 1916.

Application filed May 4, 1915. Serial No. 25,871.

*To all whom it may concern:*

Be it known that I, ALFRED WILKINSON, a subject of the King of Great Britain, and resident of Brook street, Ilkley, Yorkshire, England, garage proprietor, have invented new and useful Improvements Relating to the Construction of the Bodies of Motor-Cars and other Vehicles, of which the following is a specification.

My present invention has reference to the construction of the bodies of motor cars and other vehicles in which metal tubes are employed to make the framework. In such constructions there is considerable difficulty in providing for the attachment of the panels and upholstery which complete the body and of the wooden fillets which are required to facilitate these attachments. The tubes should be of hard metal for strength and lightness but for the panels a more ductile metal is preferable. The difficulties of welding, soldering or brazing panels of ductile metal to hard metal tubes will be easily appreciated.

According to my invention I sheath the metal tubes of the framing which tubes are preferably filled with slag wool or other heat resisting material, which will also stop resonance, with metal which can be easily welded, soldered, brazed or otherwise caused to adhere to the metal panels. The metal of the sheathing and of the panels may be the same, or if different the metals should be of a kind to harmonize and so readily weld together or be equally amenable to the brazing or soldering operation. The seam of the sheathing may remain open until closed by the attachment of the panel at that point.

As an alternative for attaching the panels and upholstery, fillets of wood or similar material capable of receiving screws, tacks, etc., are secured to the tube by bolting the same through at convenient intervals. Panels may be screwed to the fillets where they extend beyond the tubes of the frames. In the same way wood for the moldings is attached.

Only sufficient wood will be used to provide suitable moldings for the doors and windows and for the attachment of the panels and upholstery.

It is the object of the invention to provide a body construction as light as possible without sacrificing strength.

The tubular construction is eminently strong and light and it is only the want of a satisfactory attachment for the panels and upholstery that has prevented its more general adoption.

I have illustrated my invention in the accompanying drawing.

Figure 1 is a cross section of a frame tube at the point where sheathing is attached, the edge of a panel being brazed or soldered to the sheathing. Fig. 2 is a similar view showing the panel attached a little distance from its edge and a fillet of wood screwed to the panel. Fig. 3 is a similar view showing a wooden molding in contact with the panel but attached by a bolt to the tube itself. Fig. 4 shows the wooden molding bolted to the tube and a panel screwed to the molding.

*a* is the frame tube, preferably packed with slag wool *b*.

*c* is a strip or collar of fairly ductile metal lapped around the tube *a* so as to form a sheathing, the edges of which butt together at the joint.

*d* is the panel brazed, soldered or otherwise caused to adhere to the sheathing. In the drawing the point of attachment is the joint where the edges of the sheathing butt together.

*e* is a piece of wood to form a molding to serve as an attachment for upholstery or the panels.

In Fig. 2 the wood is secured to that part of the panel which extends beyond the tube by means of screws *f*.

In Figs. 3 and 4 the wood is fixed to the tube by bolts *g* passing through the wood and through the tube and secured by a segmental washer *h* and nut *i* on the other side.

The panel is secured either by means of brazing, etc., as in Fig. 3 or by screws to the wood *e* as in Fig. 4.

The bodies of the vehicles constructed in accordance with my invention are inexpensive and durable and are eminently satisfactory in every way.

What I claim and desire to secure by Letters Patent of the United States is:—

1. In tubular metal frames for vehicle bodies, the combination of relatively hard tubes, relatively soft sheathing thereon, and relatively soft panels attached to the sheathing.

2. In tubular metal frames for vehicle bodies, the combination of relatively hard metal tubes, relatively soft metal sheathing thereon, and relatively soft metal panels attached to the sheathing by fusion of metals.

In testimony whereof I have signed my name to this specification in the presence of two subscribing witnesses.

ALFRED WILKINSON.

Witnesses:
LAVINIA TURNER,
HERBERT SYKES.